(12) United States Patent
Cao

(10) Patent No.: US 7,174,193 B2
(45) Date of Patent: Feb. 6, 2007

(54) POWER SUPPLY WITH IMAGE CATCHING, SOUND READING AND OUTPUT ARRANGEMENT

(75) Inventor: Zheng-Fang Cao, Taipei Hsien (TW)

(73) Assignee: Advanced Connectek Inc., Taipei Hsien (TW)

( * ) Notice: Subject to any disclaimer, the term of this patent is extended or adjusted under 35 U.S.C. 154(b) by 161 days.

(21) Appl. No.: 10/920,303

(22) Filed: Aug. 18, 2004

(65) Prior Publication Data

US 2005/0250556 A1    Nov. 10, 2005

(30) Foreign Application Priority Data

May 5, 2004    (TW) ................................ 93112648 A

(51) Int. Cl.
*H04B 1/38* (2006.01)
(52) U.S. Cl. ........................................ 455/573; 455/572
(58) Field of Classification Search ............ 455/432.3, 455/434, 435.1, 572–573; 348/365, 207.99, 348/211.1, 211.2; 379/428.04, 428.02
See application file for complete search history.

(56) References Cited

U.S. PATENT DOCUMENTS 5,438,372 A  *  8/1995  Tsumori et al. ............. 348/565
2004/0018838 A1 * 1/2004 Chang ..................... 455/432.3

* cited by examiner

*Primary Examiner*—George Eng
*Assistant Examiner*—Phuoc Doan
(74) *Attorney, Agent, or Firm*—Troxell Law Office, PLLC

(57) ABSTRACT

An apparatus comprises one or more image catching and sound reading assemblies each adapted to catch images and read sound, convert the images and the sound into image and sound signals, and send the image and sound signals in electromagnetic waves; and a power supply assembly distal from the image catching and sound reading assemblies and including a receiver circuit having an associated antenna for receiving electromagnetic waves containing the image and sound signals from the image catching and sound reading assembly and sending the processed images and sound signals to an AV player for display and broadcasting, and power supply means for supplying power to the AV player. The invention enables a user to monitor a person's (or persons') activities by watching screen of the AV player and listening to broadcasted sound.

8 Claims, 3 Drawing Sheets

POWER SUPPLY WITH IMAGE CATCHING, SOUND READING AND OUTPUT ARRANGEMENT

BACKGROUND OF THE INVENTION

1. Field of the Invention

The present invention relates to power supplies and more particularly to an apparatus comprising one or more image catching and sound reading assemblies each including lens and sound reading means for catching images and reading sound and a transmitter, and a portable power supply including a receiver for receiving radio waves containing image and sound signals from the image catching and sound reading assemblies and sending processed images and sound to an AV (audio/video) player for display and broadcasting, and power supply means for supplying power to the AV player.

2. Description of Related Art

Conventionally, a DVD, VCD, or the like is powered by an external power supply (e.g., portable power supply, wall outlet or automobile power) rather than one or more small cells. This is because power consumption of such product is very large. Further, the commercially available power supplies have only one function, i.e., supplying power. For DVDs or VCDs, they are only adapted to play CD, VCD, or the like, i.e., music or movie playing feature.

In another view, for safety reason, there is a need to have a device to monitor their living environment or young children' activities in any place any time. However, such devices are adapted to catch images only. Hence, people have to either buy an additional monitor for cooperating with the image catching device or attach the image catching device to a computer. The above configuration has the drawbacks of being uneasily portable, cost increase, geographical limitations, etc. Thus, continuing improvements in the exploitation of power supply are constantly being sought.

SUMMARY OF THE INVENTION

It is an object of the present invention to provide an apparatus formed by combining an AV player, a power supply assembly having signal receiving, processing, and sending capabilities, and one or more remote image catching and sound reading assemblies having signal transmitting capability together. By utilizing the present invention, a user is able to monitor a person's (or persons') activities conveniently and effectively by watching screen of the AV player and listening to sound broadcasted by the AV player.

To achieve the above and other objects, the present invention provides an apparatus comprising, AV means; a power supply assembly coupled to the AV means for supplying power thereto and for signal communication; and one or more image catching and sound reading assemblies each located distal from the power supply assembly; wherein each of the image catching and sound reading assemblies is operative to catch images and read sound from a location thereof, convert the images and the sound into image and sound signals, and send the image and sound signals in a form of electromagnetic waves to the power supply assembly, and the power supply assembly is operative to send the image and sound signals from each of the image catching and sound reading assemblies to the AV means for display and broadcasting.

The above and other objects, features and advantages of the present invention will become apparent from the following detailed description taken with the accompanying drawings.

DETAILED DESCRIPTION OF THE PREFERRED EMBODIMENTS

Figure 1:
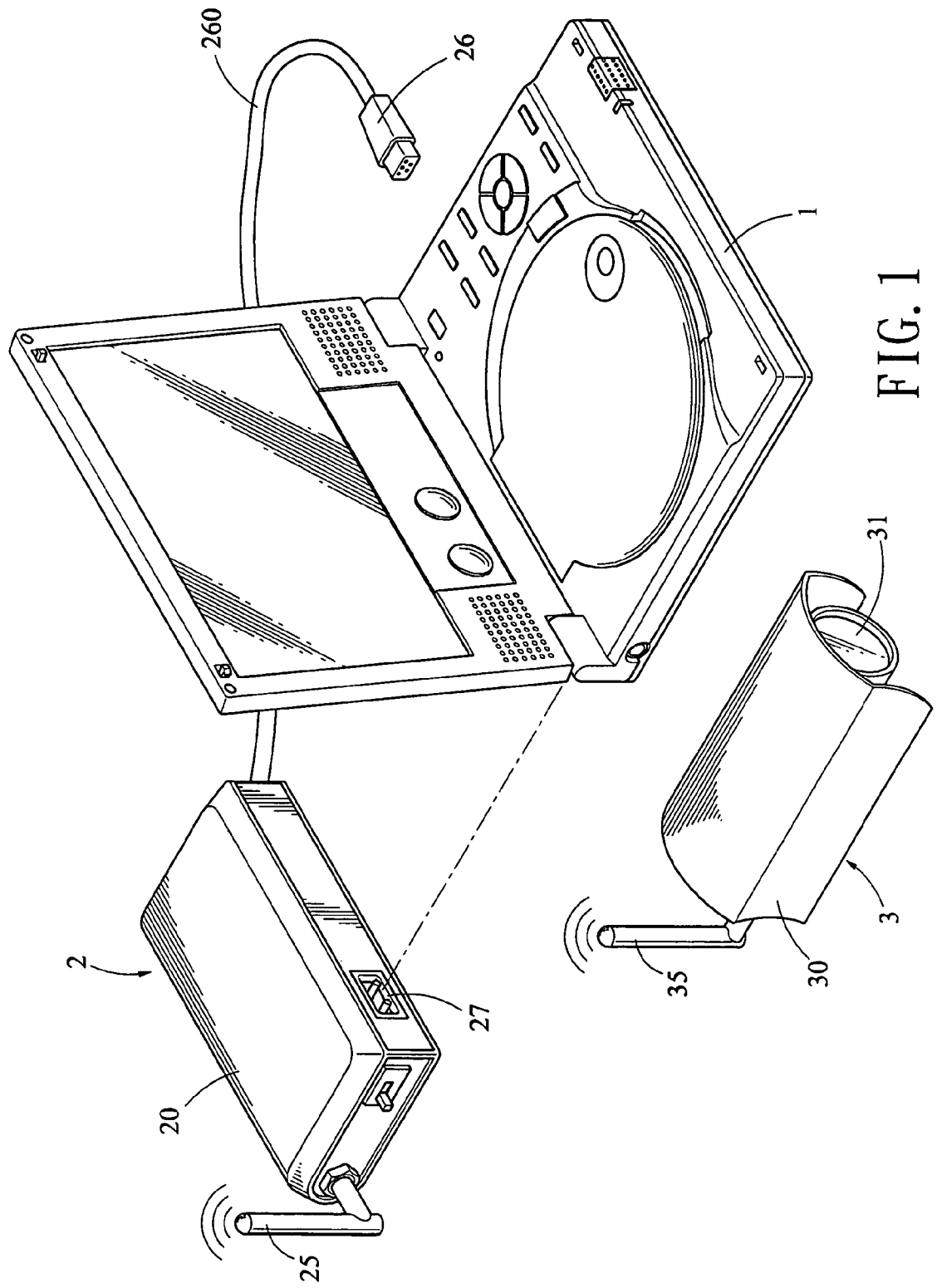
FIG. 1 is an exploded perspective view of a first preferred embodiment of power supply with image catching, sound reading and output arrangement according to the invention.
Figure 2:
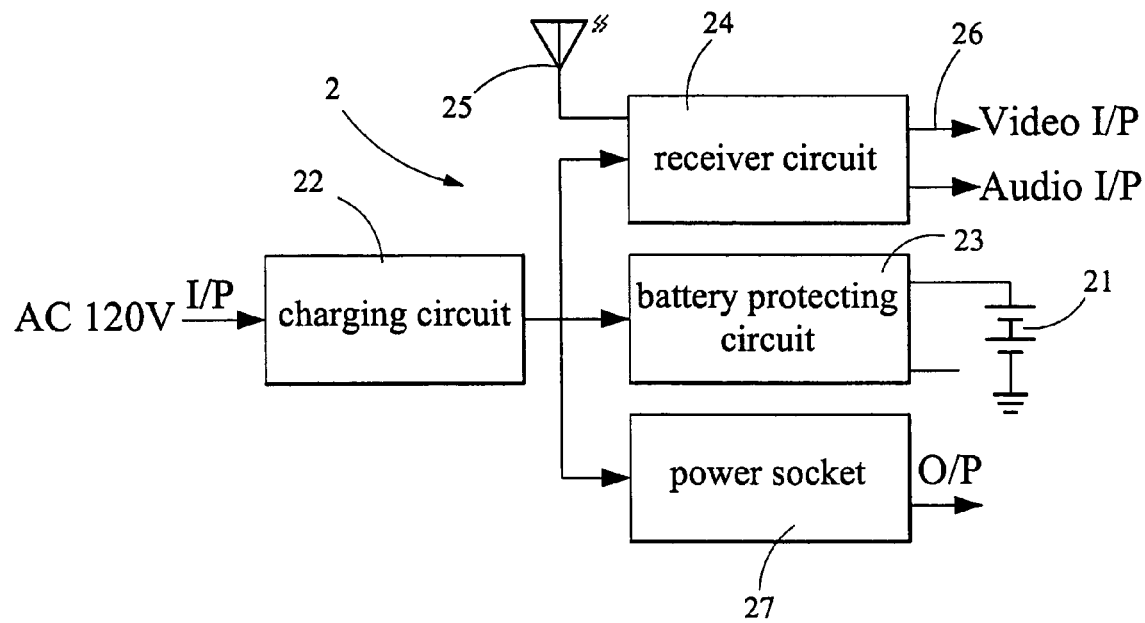
FIGS. 2 and 3 are block diagrams of power supply assembly and image catching and sound reading assembly shown in FIG. 1 respectively.
Figure 3:
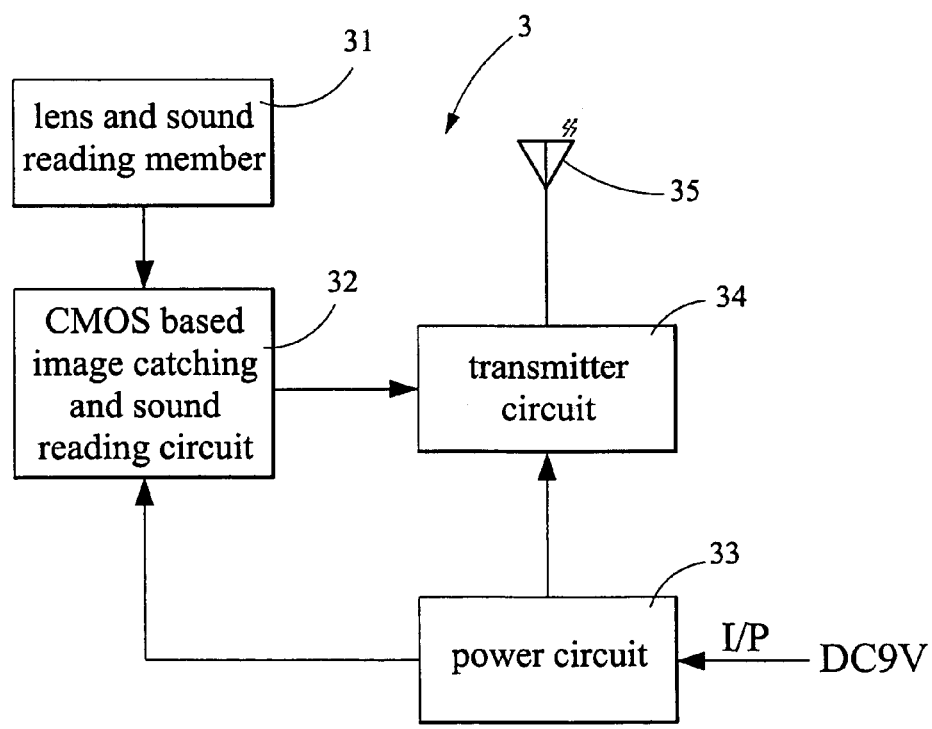

Referring to FIGS. 1 to 3, there is shown a power supply apparatus constructed in accordance with a first preferred embodiment of the invention. The power supply apparatus comprises an AV player 1, a power supply assembly 2, and an image catching and sound reading assembly 3. Each component will be described in detailed below.

The AV player 1 is a commercially available video player having a screen, such as a DVD player digital camera, portable computer, or cellular phone. The power supply assembly 2 is shaped as a parallelepiped housing 20 and comprises a rechargeable battery 21, a charging circuit 22, a battery protecting circuit 23, a receiver circuit 24, an antenna 25 coupled to the receiver circuit 24, a cable 26 extended to couple to the AV player 1 for signal communication, and a power socket 27 for supplying power to the AV player 1 via a power cord (not shown). External AC source (e.g., 120V) can be fed to the charging circuit 22 via a charging socket (not shown) for conversion into DC and DC is then sent to the battery 21 via the battery protecting circuit 23 in a charging process. The battery 21 is adapted to supply power to both the AV player 1 and the receiver circuit 24 for maintaining their normal operation. The antenna 25 can receive electromagnetic waves from the image catching and sound reading assembly 3 and the received electromagnetic waves are then sent to the receiver circuit 24 for processing image and sound signals contained therein. Finally, processed images and sound are sent to the AV player 1 for display and broadcasting via the cable 26.

The image catching and sound reading assembly 3 can be fixedly mounted or be implemented as a portable one. As shown in FIGS. 1 and 3, the image catching and sound reading assembly 3 is shaped as a case 30 and comprises a lens and sound reading member 31, a CMOS based image catching and sound reading circuit 32 adapted to convert images and sound taken by the lens and sound reading member 31 into image and sound signals, a power circuit 33, a transmitter circuit 34, and an antenna 35 coupled to the transmitter circuit 34. The power circuit 33 is adapted to supply power to other components of the image catching and sound reading assembly 3 for maintaining their normal operation. The transmitter circuit 34 is adapted to send the image and sound signals to the antenna 35 which then sends the same in the form of electromagnetic waves to the antenna 25 for receiving.

In an exemplary example, a parent can install the image catching and sound reading assembly 3 in a remote place where his/her young child is playing or doing other things. Next, couple the power supply assembly 2 to the AV player 1 in a manner as described above. As such, the parent can monitor the child's activities in real time picture from the screen of the AV player 1.

Figure 4:
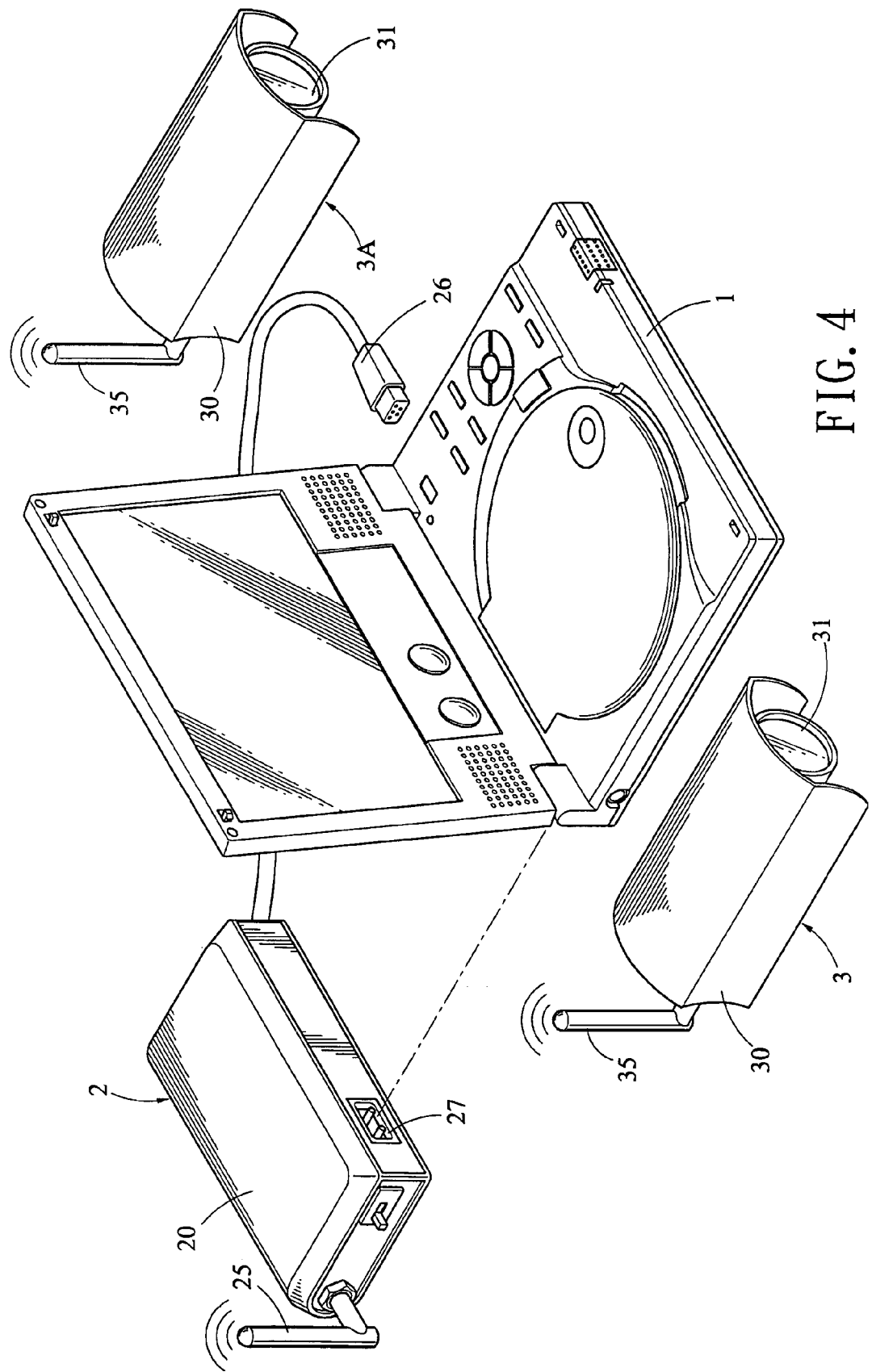
FIG. 4 is an exploded perspective view of a second preferred embodiment of power supply with multiple image catching, sound reading and output arrangements according to the invention.

Referring to FIG. 4, there is shown a power supply apparatus constructed in accordance with a second preferred embodiment of the invention. The second preferred embodiment substantially has same structure as the first preferred embodiment. The characteristic of the second preferred embodiment is detailed below. The power supply apparatus comprises an additional image catching and sound reading assembly 3A which is located in a place different from that of the image catching and sound reading assembly 3 shown in FIG. 1. As such, a multiple monitoring locations can be effected. In this embodiment, a picture in picture is displayed on the screen of the AV player 1. This embodiment enables a person to monitor safety situation in two locations at a time, such as monitoring a visiting person in indoor or outdoor environment and young children' activities location. Of course, three or more image catching and sound reading assemblies 3 can also be possibly carried out in other embodiments if such need arises.

While the invention herein disclosed has been described by means of specific embodiments, numerous modifications and variations could be made thereto by those skilled in the art without departing from the scope and spirit of the invention set forth in the claims.

What is claimed is:

1. An apparatus comprising:
   AV means;
   a power supply assembly coupled to the AV means for supplying power thereto and for signal communication; and
   an image catching and sound reading assembly located in a position distal from the power supply assembly;
   wherein the image catching and sound reading assembly is operative to catch images and read sound from a monitoring location thereof, convert the images and the sound into image and sound signals, and send the image and sound signals in a form of electromagnetic waves to the power supply assembly, and the power supply assembly is operative to send the image and sound signals to the AV means for display and broadcasting,
   wherein the power supply assembly comprises a charging circuit, a battery protecting circuit connected to the charging circuit, a rechargeable battery connected to the battery protecting circuit, a receiver circuit connected to the battery protecting circuit and the charging circuit, a first antenna coupled to the receiver circuit, and a cable extended to couple to the AV means.

2. The apparatus of claim 1, wherein the power supply assembly further comprises a power socket for supplying power to the AV means.

3. The apparatus of claim 1, wherein the image and sound signals received by the power supply assembly are sent to the AV means via the cable.

4. An apparatus comprising:
   AV means;
   a power supply assembly coupled to the AV means for supplying power thereto and for signal communication; and
   an image catching and sound reading assembly located in a position distal from the power supply assembly;
   wherein the image catching and sound reading assembly is operative to catch images and read sound from a monitoring location thereof, convert the images and the sound into image and sound signals, and send the image and sound signals in a form of electromagnetic waves to the power supply assembly, and the power supply assembly is operative to send the image and sound signals to the AV means for display and broadcasting,
   wherein the image catching and sound reading assembly comprises:
   a lens and sound reading member for catching images and reading sound from the monitoring location of the image catching and sound reading assembly;
   a CMOS based image catching and sound reading circuit adapted to convert the images taken and the sound read by the lens and sound reading member into image and sound signals;
   a transmitter circuit connected to the CMOS based image catching and sound reading circuit;
   a second antenna coupled to the transmitter circuit; and a power circuit connected to the transmitter circuit and the CMOS based image catching and sound reading circuit;
   wherein the transmitter circuit is adapted to send the image and sound signals to the second antenna, and the second antenna is adapted to send the image and sound signals in the form of electromagnetic waves to the first antenna for receiving.

5. An apparatus comprising:
   AV means:
   a power supply assembly coupled to the AV means for supplying power thereto and for signal communication; and
   a plurality of image catching and sound reading assemblies located in a plurality of different monitoring locations each being distal from the power supply assembly;
   wherein each of the image catching and sound reading assemblies is operative to catch images and read sound from a location thereof, convert the images and the sound into image and sound signals, and send the image and sound signals in a form of electromagnetic waves to the power supply assembly, and the power supply assembly is operative to send the image and sound signals from each of the image catching and sound reading assemblies to the AV means for display and broadcasting a picture,
   wherein the power supply assembly comprises a charging circuit, a battery protecting circuit connected to the charging circuit, a rechargeable battery connected to the battery protecting circuit, a receiver circuit connected to the battery protecting circuit and the charging circuit, a first antenna coupled to the receiver circuit, and a cable extended to couple to the AV means.

6. The apparatus of claim 5, wherein the power supply assembly further comprises a power socket for supplying power to the AV means.

7. The apparatus of claim 5, wherein the image and sound signals received by the power supply assembly are sent to the AV means via the cable.

8. An apparatus comprising:
   AV means:
   a power supply assembly coupled to the AV means for supplying power thereto and for signal communication; and
   a plurality of image catching and sound reading assemblies located in a plurality of different monitoring locations each being distal from the power supply assembly;

wherein each of the image catching and sound reading assemblies is operative to catch images and read sound from a location thereof, convert the images and the sound into image and sound signals, and send the image and sound signals in a form of electromagnetic waves to the power supply assembly, and the power supply assembly is operative to send the image and sound signals from each of the image catching and sound reading assemblies to the AV means for display and broadcasting a picture, wherein the image catching and sound reading assembly comprises:

a lens and sound reading member for catching images and reading sound from the monitoring location of the image catching and sound reading assembly;

a CMOS based image catching and sound reading circuit adapted to convert the images taken and the sound read by the lens and sound reading member into image and sound signals;

a transmitter circuit connected to the CMOS based image catching and sound reading circuit;

a second antenna coupled to the transmitter circuit; and a power circuit connected to the transmitter circuit and the CMOS based image catching and sound reading circuit;

wherein the transmitter circuit is adapted to send the image and sound signals to the second antenna, and the second antenna is adapted to send the image and sound signals in the form of electromagnetic waves to the first antenna for receiving.

* * * * *